(12) United States Patent
Sakakibara et al.

(10) Patent No.: US 11,208,702 B2
(45) Date of Patent: Dec. 28, 2021

(54) HOT-ROLLED STEEL SHEET AND MANUFACTURING METHOD THEREOF

(71) Applicant: NIPPON STEEL & SUMITOMO METAL CORPORATION, Tokyo (JP)

(72) Inventors: Akifumi Sakakibara, Tokyo (JP); Tatsuo Yokoi, Tokyo (JP); Hiroshi Shuto, Tokyo (JP); Yuuki Kanzawa, Tokyo (JP); Masafumi Azuma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 380 days.

(21) Appl. No.: 16/263,457

(22) Filed: Jan. 31, 2019

(65) Prior Publication Data

US 2019/0161820 A1 May 30, 2019

Related U.S. Application Data

(62) Division of application No. 14/778,443, filed as application No. PCT/JP2014/062701 on May 13, 2014, now Pat. No. 10,260,124.

(51) Int. Cl.
| | |
|---|---|
| *C21D 9/46* | (2006.01) |
| *C21D 8/02* | (2006.01) |
| *B32B 15/01* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/16* | (2006.01) |
| *C22C 38/38* | (2006.01) |
| *B21B 1/26* | (2006.01) |
| *B21B 1/46* | (2006.01) |
| *B21B 3/02* | (2006.01) |
| *C23C 2/06* | (2006.01) |
| *C23C 2/40* | (2006.01) |
| *C22C 38/14* | (2006.01) |
| *C22C 38/58* | (2006.01) |
| *B21B 1/22* | (2006.01) |
| *C22C 38/26* | (2006.01) |
| *C22C 38/28* | (2006.01) |
| *C22C 38/32* | (2006.01) |

(52) U.S. Cl.
CPC .............. *C21D 9/46* (2013.01); *B21B 1/22* (2013.01); *B21B 1/26* (2013.01); *B21B 1/46* (2013.01); *B21B 3/02* (2013.01); *B32B 15/013* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/38* (2013.01); *C22C 38/58* (2013.01); *C23C 2/06* (2013.01); *C23C 2/40* (2013.01); *B21B 2001/225* (2013.01); *C21D 2211/002* (2013.01); *C21D 2211/008* (2013.01)

(58) Field of Classification Search
CPC .......................................................... C21D 9/46
See application file for complete search history.

(56) References Cited

U.S. PATENT DOCUMENTS

| | | | |
|---|---|---|---|
| 6,183,573 B1 | 2/2001 | Fujiwara et al. | |
| 6,264,760 B1 | 7/2001 | Tamehiro et al. | |
| 2009/0223609 A1 | 9/2009 | Hakomori et al. | |
| 2011/0008647 A1* | 1/2011 | Azuma | C21D 9/46 |
| | | | 428/659 |
| 2011/0259481 A1 | 10/2011 | Hong et al. | |
| 2013/0319582 A1 | 12/2013 | Yokoi et al. | |
| 2014/0290322 A1 | 10/2014 | Evertz et al. | |
| 2015/0329950 A1 | 11/2015 | Azuma et al. | |

FOREIGN PATENT DOCUMENTS

| | | |
|---|---|---|
| CN | 1265709 A | 9/2000 |
| CN | 102264936 A | 11/2011 |
| EP | 0 753 596 B1 | 5/2000 |
| EP | 1 025 272 A1 | 8/2000 |
| JP | 2000-109951 A | 4/2000 |

(Continued)

OTHER PUBLICATIONS

Chinese Office Action and Search Report, dated May 30, 2016, for corresponding Chinese Application No. 201480025233.5.

Chinese Office Action dated Feb. 6, 2017, for corresponding Chinese Patent Application No. 201480025233.5 (with English translation).

English translation of the International Preliminary Report on Patentability and Written Opinion of the International Searching Authority (Forms PCT/IB/338, PCT/IB/373 and PCT/ISA/237), dated Nov. 26, 2015, for International Application No. PCT/JP2014/062701.

Extended European Search Report for corresponding European Application No. 14798454.6, dated Dec. 1, 2016.

(Continued)

*Primary Examiner* — Christopher S Kessler

(74) *Attorney, Agent, or Firm* — Birch, Stewart, Kolasch & Birch, LLP

(57) ABSTRACT

There is provided a hot-rolled steel sheet in which a composition contains: in mass %, C: 0.01% to 0.2%; Si: 2.5% or less; Mn: 4.0% or less; P: 0.10% or less; S: 0.03% or less; Al: 0.001% to 2.0%; N: 0.01% or less; O: 0.01% or less; Ti: 0.01 to 0.30%; and the balance being composed of iron and impurities and a structure is composed of by volume fraction, 90% or more of tempered martensite with an average aspect ratio of 2 or less, or 90% or more in total of both tempered martensite and lower bainite.

3 Claims, No Drawings

(56) References Cited

FOREIGN PATENT DOCUMENTS

| JP | 2001-89811 A | 4/2001 |
|---|---|---|
| JP | 2006-161139 A | 6/2006 |
| JP | 2007-308744 A | 11/2007 |
| JP | 2008-231474 A | 10/2008 |
| JP | 2008-248341 A | 10/2008 |
| JP | 2008-266695 A | 11/2008 |
| JP | 2009-52106 A | 3/2009 |
| JP | 2010-138421 A | 6/2010 |
| JP | 2011-17044 A | 1/2011 |
| JP | 2011-52321 A | 3/2011 |
| JP | 2012-77340 A | 4/2012 |
| JP | 2013-14844 A | 1/2013 |
| JP | 6008039 B2 | 10/2016 |
| KR | 10-2010-0076745 A | 7/2010 |
| TW | 201247894 A1 | 12/2012 |
| WO | WO 2010/074473 A2 | 7/2010 |
| WO | WO 2012/133636 A1 | 10/2012 |
| WO | WO 2013/007729 A1 | 1/2013 |

OTHER PUBLICATIONS

International Search Report, issued in PCT/JP2014/062701, dated Jul. 15, 2014.
Japanese Office Action dated Oct. 25, 2016, for corresponding Japanese patent application No. 2015-517083.
Korean Office Action dated Aug. 4, 2016, for corresponding Korean patent application No. 10-2015-7028530.
Written Opinion of the International Searching Authority, issued in PCT/JP2014/062701, dated Jul. 15, 2014.
Non-Final Office Action dated Mar. 26, 2018, issued in U.S. Appl. No. 14/778,443.
Notice of Allowance dated Nov. 21, 2018, issued in U.S. Appl. No. 14/778,443.
Restriction Requirement dated Jan. 5, 2018, issued in U.S. Appl. No. 14/778,443.

* cited by examiner

HOT-ROLLED STEEL SHEET AND MANUFACTURING METHOD THEREOF

This application is a Divisional of U.S. application Ser. No. 14/778,443, filed Sep. 18, 2015, now U.S. Pat. No. 10,260,124, issued Apr. 16, 2019, which is the U.S. National Phase of PCT/JP 2014/062701, filed May 13, 2014, which claims priority under 35 U.S.C. 119(a) to Japanese Patent Application No. 2013-102144, filed May 14, 2013, the contents of which are incorporated by reference, in their entirety, into the present specification.

TECHNICAL FIELD

The present invention relates to a high-strength hot-rolled steel sheet having a maximum tensile strength of 980 MPa or more and excellent low temperature toughness and a manufacturing method thereof, and in particular, relates to a hot-rolled steel sheet including low temperature toughness for enabling the use in a cryogenic region and a manufacturing method thereof.

BACKGROUND ART

Reduction in weight of an automobile body has been promoted by using a high-strength steel sheet in order to suppress emission of carbon dioxide gas from an automobile. Further, in addition to mild steel sheets, a lot of high-strength steel sheets having a maximum tensile strength of 980 MPa or more have been used for the automobile body in order to ensure safety of passengers.

Further, there is a requirement that such a steel sheet used for a member is formed to then be attached to an automobile as a part and then even if the member receives a shock due to collision or the like, the member is not easily destroyed, and further there is also a requirement to improve also low temperature toughness in order to ensure shock resistance at a cold district in particular. This low temperature toughness is prescribed by vTrs (Charpy fracture appearance transition temperature) or the like. Therefore, it is also necessary to consider the above-described shock resistance itself of a steel product. In addition, when the steel sheet is increased in strength, plastic deformation of the steel sheet becomes difficult, while a concern for destruction becomes higher, and therefore toughness is required as an important property.

As for a method of improving toughness in a high-strength steel sheet, for example, Patent Literature 1 discloses a manufacturing method, and there is known a method of setting a martensite phase with an adjusted aspect ratio to a main phase.

Generally, it is known that the aspect ratio of martensite relies on an aspect ratio of austenite grains before transformation. That is, martensite with a large aspect ratio means martensite transformed from non-recrystallized austenite (austenite extended by rolling), and martensite with a small aspect ratio means martensite transformed from recrystallized austenite.

It is necessary to increase a finish rolling temperature to enable recrystallization of austenite, and there is a tendency that a grain diameter of austenite and furthermore a grain diameter of martensite become large. Generally, it is known that refining of a grain diameter creates an effect of improving toughness, and therefore, when the aspect ratio decreases, it is possible to decrease a factor of toughness deterioration resulting from a shape, but toughness deterioration resulting from coarsening of crystal grains is caused, so that there is a limit in improvement in low temperature toughness.

Patent Literature 1 refers to a method for producing a thick steel sheet for structural member of a large-sized industrial construction machine and the like that includes both high strength and high toughness by obtaining 3 to 18 of an aspect ratio of prior austenite grains, but the steel sheet for automobile is required to have further excellent low temperature toughness. Further, the steel sheet having grains with such an aspect ratio has anisotropy of mechanical properties, to thus have difficulty being formed into a general automobile member, resulting in that there exists a problem that the use is limited.

Patent Literature 2 discloses that ferrite grains with an aspect ratio of 2 or less are set to a main phase to thereby fabricate a high-toughness steel sheet. However, the main phase of this steel sheet is ferrite, so that it is difficult to ensure the tensile strength of 980 MPa or more.

Patent Literature 3 discloses that carbides are made to finely precipitate in ferrite having an average grain diameter set to 5 to 10 μm, to thereby improve strength and low temperature toughness of a steel sheet. According to the method described in Patent Literature 3, solid-solution Ti and/or the like in steel are/is made to precipitate as carbide, to thereby increase strength of the steel sheet. However, in order to ensure a tensile strength of 980 MPa or more, finer precipitation and denser dispersion are needed, and detailed setting of cooling conditions after finish rolling is required. Therefore, it is conceivable that the steel sheet manufactured by this method has difficulty ensuring a tensile strength of 980 MPa or more stably.

Patent Literature 4 discloses that the structure of a steel sheet is set to a single phase made of bainite phase or bainitic ferrite phase and the amount of cementite at grain boundaries is suppressed, to thereby improve low temperature toughness of the steel sheet. However, the steel sheet described in Patent Literature 4 has a tensile strength of 604 to 764 MPa, and therefore it is conceivably difficult to ensure a tensile strength of 980 MPa or more. Additionally, manufacture of a thick hot-rolled steel sheet having a sheet thickness of 8.7 mm or more is described, but no mention is made regarding a manufacturing method of a thin hot-rolled steel sheet used for an automobile steel sheet.

Patent Literature 5 discloses that when manufacturing a high-strength steel sheet having a tensile strength of 980 MPa or more, generation of a MA (martensite-austenite mixed structure) phase to be a starting point of destruction is suppressed, to thereby improve low temperature toughness. Generally, the mechanism in which the MA phase appears results from the fact that C is concentrated in austenite by some kind of cause. Thus, the steel type described in Patent Literature 5 contains fixed amounts of Ti, Nb, V, and Mo, which are carbide forming elements, to thereby capture C to suppress concentration into austenite, and thereby the generation of the MA phase is suppressed.

However, these carbide forming elements are expensive and are required to be added in large amounts, so that the steel sheet described in Patent Literature 5 is poor in economic efficiency. Additionally, in Patent Literature 5, low temperature toughness of a welding joint portion is mentioned, but no mention is made regarding low temperature toughness of a parent metal, which is important for the steel sheet for an automobile body.

As above, a high-strength steel sheet that exceeds 980 MPa has difficulty including excellent low temperature toughness simultaneously.

CITATION LIST

Patent Literature

Patent Literature 1: Japanese Laid-open Patent Publication No. 2011-52321
Patent Literature 2: Japanese Laid-open Patent Publication No. 2008-231474
Patent Literature 3: Japanese Laid-open Patent Publication No. 2011-17044
Patent Literature 4: Japanese Laid-open Patent Publication No. 2013-014844
Patent Literature 5: Japanese Laid-open Patent Publication No. 2012-077340
Patent Literature 6: Japanese Laid-open Patent Publication No. 2000-109951
Patent Literature 7: Japanese Laid-open Patent Publication No. 2010-138421
Patent Literature 8: Japanese Laid-open Patent Publication No. 2009-052106
Patent Literature 9: Japanese Laid-open Patent Publication No. 2008-266695
Patent Literature 10: Japanese Laid-open Patent Publication No. 2006-161139

SUMMARY OF INVENTION

Technical Problem

The present invention has been made in consideration of the above-described problems, and an object thereof is to provide a hot-rolled steel sheet having both a maximum tensile strength of 980 MPa or more and excellent low temperature toughness and a manufacturing method thereof.

Solution to Problem

The present inventors were successful in manufacturing a steel sheet having a maximum tensile strength of 980 MPa or more and excellent low temperature toughness by optimizing components and manufacturing conditions of a hot-rolled steel sheet and controlling structure of the steel sheet. The gist thereof is as follows.

(1) A hot-rolled steel sheet, includes:
a structure that is a composition containing, in mass %,
C: 0.01 to 0.2%;
Si: 2.5% or less (not including "0" (zero));
Mn: 4.0% or less (not including "0" (zero));
P: 0.10% or less;
S: 0.03% or less;
Al: 0.001% to 2.0%;
N: 0.01% or less (not including "0" (zero));
O: 0.01% or less (not including "0" (zero));
Ti: 0.03 to 0.30%;
Nb: "0" (zero) to 0.30%;
Cu: "0" (zero) to 2.0%;
Ni: "0" (zero) to 2.0%;
Mo: "0" (zero) to 1.0%;
V: "0" (zero) to 0.3%;
Cr: "0" (zero) to 2.0%;
Mg: "0" (zero) to 0.01%;
Ca: "0" (zero) to 0.01%;
REM: "0" (zero) to 0.1%;
B: "0" (zero) to 0.01%; and
the balance being composed of iron and impurities and in which by volume fraction, 90% or more of grain-shaped tempered martensite, or by volume fraction, 90% or more in total of both grain-shaped tempered martensite and lower bainite is contained and an average aspect ratio of the tempered martensite and the lower bainite is 2 or less.

(2) The hot-rolled steel sheet according to (1) described above, in which an effective crystal grain diameter of the tempered martensite and the lower bainite is 10 μm or less.

(3) The hot-rolled steel sheet according to (1) or (2) described above, in which $1\times10^6$ (pieces/mm$^2$) or more of iron-based carbides exist in the tempered martensite and the lower bainite.

(4) The high-strength hot-rolled steel sheet according to any one of (1) to (3), further includes:
in mass %,
Nb: 0.01 to 0.30%.

(5) The hot-rolled steel sheet according to any one of (1) to (4) described above, further includes:
in mass %,
one type or two or more types selected from the group consisting of
Cu: 0.01 to 2.0%;
Ni: 0.01 to 2.0%;
Mo: 0.01 to 1.0%;
V: 0.01 to 0.3%; and
Cr: 0.01 to 2.0%.

(6) The hot-rolled steel sheet according to any one of (1) to (5) described above, further includes:
in mass %,
one type or two or more types selected from the group consisting of
Mg: 0.0005 to 0.01%;
Ca: 0.0005 to 0.01%; and
REM: 0.0005 to 0.1%.

(7) The hot-rolled steel sheet according to any one of (1) to (6) described above, further includes:
in mass %,
B: 0.0002 to 0.01%.

(8) The hot-rolled steel sheet according to any one of (1) to (7) described above, in which a galvanized layer or an alloyed galvanized layer is included on a surface of the hot-rolled steel sheet.

(9) A manufacturing method of a hot-rolled steel sheet, includes:
smelting a steel containing:
in mass %,
C: 0.01 to 0.2%;
Si: 2.5% or less (not including "0" (zero));
Mn: 4.0% or less (not including "0" (zero));
P: 0.10% or less;
S: 0.03% or less;
Al: 0.001 to 2.0%;
N: 0.01% or less (not including "0" (zero));
0: 0.01% or less (not including "0" (zero));
Ti: 0.03 to 0.30%;
Nb: "0" (zero) to 0.30%;
Cu: "0" (zero) to 2.0%;
Ni: "0" (zero) to 2.0%;
Mo: "0" (zero) to 1.0%;
V: "0" (zero) to 0.3%;
Cr: "0" (zero) to 2.0%;
Mg: "0" (zero) to 0.01%;
Ca: "0" (zero) to 0.01%;
REM: "0" (zero) to 0.1%;
B: "0" (zero) to 0.01%; and
the balance being composed of iron and impurities and casting the steel into a slab, and then directly heating the cast slab to 1200° C. or higher or once cooling the cast slab and then heating the cast slab to 1200° C. or higher; performing hot rolling in which a reduction ratio of rolling at the final stage of rough rolling is set to 25% or more and a rolling temperature is set to lower than 1100° C. and the rough rolling is completed, an obtained rough-rolled piece is heated by 10° C. or higher before finish rolling, and a finishing temperature of finish rolling to be performed subsequently is set to 900° C. or higher; and performing cooling at an average cooling rate of 50° C./sec or more from the finishing temperature of the finish rolling to 400° C. and performing coiling at 100° C. or higher to lower than 400° C.

(10) The manufacturing method of the hot-rolled steel sheet according to (9) described above, further includes: performing a galvanizing treatment or a galvanealed treatment after the coiling.

Advantageous Effects of Invention

According to the present invention, it is possible to provide a high-strength hot-rolled steel sheet that has a maximum tensile strength of 980 MPa or more and excellent low temperature toughness.

DESCRIPTION OF EMBODIMENTS

Hereinafter, the contents of the present invention will be explained in detail.

As a result of earnest examination by the present inventors, it was found that by volume fraction, 90% or more of grain-shaped tempered martensite having an average aspect ratio of effective crystal grains, (in which the average aspect ratio will be simply referred to as an aspect ratio, hereinafter), being 2 or less, or 90% or more in total of grain-shaped tempered martensite and lower bainite having an aspect ratio of effective crystal grains being 2 or less is contained, and further an effective crystal grain diameter of the tempered martensite and the lower bainite is preferably set to 10 μm or less, and additionally $1 \times 10^6$ (pieces/mm$^2$) or more of iron-based carbides existing in the tempered martensite and the lower bainite are contained, thereby making it possible to ensure a high strength of 980 MPa or more and high low temperature toughness.

Here, the effective crystal grain is an area surrounded by a grain boundary with a misorientation of 15° or more and can be measured by using EBSD or the like. Its detail will be described later.

[Microstructure of a Steel Sheet]

First, there will be explained a microstructure of a hot-rolled steel sheet of the present invention.

In the hot-rolled steel sheet of the present invention, tempered martensite, or a mixed structure of tempered martensite and lower bainite is set to the main phase and the total volume fraction thereof is set to 90% or more, and thereby a maximum tensile strength of 980 MPa or more is ensured. Therefore, it is necessary to obtain the main phase being tempered martensite or being a mixed structure of tempered martensite and lower bainite.

In the present invention, the tempered martensite is the most important microstructure for including strength, high bake hardenability, and low temperature toughness. The tempered martensite is an aggregation of lath-shaped crystal grains and contains iron-based carbides having a major axis of 5 nm or more inside thereof, and further the iron-based carbides are plural variants, namely belong to a plurality of iron-based carbide groups extended in different directions. Like the present invention, when a coiling temperature is set to 100° C. or higher to lower than 400° C., or when a structure of martensite is once obtained and then is tempered at 100 to 600° C., the structure of tempered martensite can be obtained.

The lower bainite is also an aggregation of lath-shaped crystal grains and contains iron-based carbides having a major axis of 5 nm or more inside thereof, and further the iron-based carbides are single variants, namely belong to an iron-based carbide group extended in one direction. By observing extension directions of carbides, the tempered martensite and the lower bainite can be distinguished easily. Here, the iron-based carbide group extended in one direction means an iron-based carbide group where the difference of the extension direction is within 5°.

The lower bainite can be obtained by setting the coiling temperature between 400° and the martensitic transformation point, and as the coiling temperature is higher in this temperature range, or as a cooling rate thereafter is slower, the ratio of lower bainite becomes larger.

When the volume fraction of one or the total of the tempered martensite and the lower bainite is less than 90%, the maximum high tensile strength of 980 MPa or more cannot be ensured, resulting in that the maximum tensile strength of 980 MPa or more, which is the requirement of the present invention, cannot be ensured. Therefore, the lower limit of the volume fraction is 90%. However, even if the volume fraction is set to 100%, strength and excellent low temperature toughness, which are the effects of the present invention, are exhibited.

As other structures, by volume fraction, 10% or less in total of one type or two or more types of ferrite, fresh martensite, upper bainite, pearlite, and retained austenite may also be contained in the steel sheet structure.

Here, the fresh martensite is defined as martensite not containing carbide. The fresh martensite is highly strong, but is extremely hard, and thus deformation concentrates at an interface with a different structure to be likely to become a starting point of destruction, resulting in that the fresh martensite is poor in low temperature toughness. Further, even if the fresh martensite is set to the main phase, hardness greatly varies even in the same fresh martensite phases, and thus an interface is likely to become a starting point of destruction. Therefore, it is necessary to limit the volume fraction of fresh martensite to 10% or less.

The retained austenite is, when a steel product is plastically deformed at the time of press-molding or an automobile part is plastically deformed at the time of collision, transformed into fresh martensite, therefore causing the above-described adverse effect similar to that of the fresh martensite. Therefore, it is necessary to limit the volume fraction to 10% or less.

The upper bainite is an aggregation of lath-shaped crystal grains and is an aggregation of laths containing carbides therebetween. The carbides contained between laths become a starting point of destruction, to thus decrease low temperature toughness. Further, as compared to the lower bainite, the upper bainite is formed at high temperature to thus be low in strength, and when the upper bainite is formed excessively, it becomes difficult to ensure the maximum tensile strength of 980 MPa or more. Such a tendency becomes prominent when the volume fraction of upper bainite becomes greater than 10%, so that it is necessary to limit the volume fraction to 10% or less.

The ferrite is a mass of crystal grains and means a structure not containing a substructure such as lath inside thereof. The ferrite is the softest structure and causes a decrease in strength, and therefore, in order to ensure the maximum tensile strength of 980 MPa or more, the ferrite needs to be limited to 10% or less. Further, it is extremely soft as compared to the tempered martensite or the lower bainite being the main phase, and thus deformation concentrates at an interface between both the structures to be likely to become a starting point of destruction, resulting in that low temperature toughness is decreased. Such a tendency becomes prominent when the volume fraction becomes greater than 10%, so that it is necessary to limit the volume fraction to 10% or less.

The pearlite, similarly to the ferrite, causes a decrease in strength and deterioration of low temperature toughness, so that it is necessary to limit the volume fraction to 10% or less.

As for the tempered martensite, fresh martensite, bainite, ferrite, pearlite, austenite, and the remaining structure that constitute the steel sheet structure of the present invention as above, identification of these structures, confirmation of existing positions, measurement of area ratios can be performed by the following methods. That is, with a nital reagent and a reagent disclosed in Japanese Laid-open Patent Publication No. 59-219473, of the steel sheet, a rolling direction cross-section or a cross section in a direction perpendicular to the rolling direction is corroded to be observed by a scanning electron microscope and a transmission electron microscope at 1000 to 100000-fold magnification, and thereby identification of these structures, confirmation of existing positions, measurement of area ratios can be performed.

Further, the structures can be distinguished also by crystal orientation analysis using an FESEM-EBSD method [crystal orientation analysis method using EBSD: Electron Back-Scatter Diffraction belonging to a field emission scanning electron microscope (FE-SEM: Field Emission Scanning Electron Microscope)], or micro-region hardness measurement such as micro Vickers hardness measurement. Since, for example, the tempered martensite, upper bainite, and lower bainite are different in formation site of iron-based carbide and crystal orientation related matter (extension direction) as described above, the bainite and the tempered martensite can be easily distinguished by observing iron-based carbides inside lath-shaped crystal grains using a FE-SEM to examine their extension directions.

In the present invention, the volume fraction of each of ferrite, pearlite, bainite, tempered martensite, and fresh martensite is calculated by the following method. First, a sample is taken from an observation surface that is a thickness-wise cross section in parallel with the rolling direction of the steel sheet, and the observation surface is polished and nital etched. Then, the range of ⅛ thickness to ⅜ thickness with ¼ of the sheet thickness being the center is observed by a FE-SEM, and area fractions are measured, which are set as the volume fractions. Further, 10 visual fields are each measured at 5000-fold magnification, and an average value of the measurements is set as the area ratio.

The fresh martensite and the retained austenite are not sufficiently corroded by nital etching, so that they can be clearly distinguished from the above-described structures (ferrite, bainitic ferrite, bainite, and tempered martensite) during the observation by the FE-SEM. Therefore, as the volume fraction of the fresh martensite, the difference between the area fraction of a non-corroded area observed by the FE-SEM and the area fraction of the retained austenite measured by an X-ray can be obtained.

Next, there will be described an average crystal grain diameter and an identification technique of the structures. In the present invention, the average crystal grain diameter, the ferrite, and further the retained austenite are defined by using an EBSP-OIM (Electron Back Scatter Diffraction Pattern-Orientation Image Microscopy) method. In the EBSP-OIM method, a device and software in which a highly inclined sample is irradiated with electron beams in a scanning electron microscope (SEM), a Kikuchi pattern formed by backscattering is photographed by a high-sensitive camera and is image processed by a computer, and thereby a crystal orientation at an irradiation point is measured for a short time period are constituted. In the EBSP-OIM method, a microstructure and a crystal orientation of a bulk sample surface can be quantitatively analyzed. Further, an analysis area of the EBSP-OIM method is an area capable of being observed by the SEM, and the EBSP-OIM method makes it possible to analyze an area with a minimum resolution of 20 nm, which varies depending on the resolution of the SEM. In the present invention, by an image mapped with a misorientation of crystal grains defined as 15° being a threshold value of a high-angle grain boundary generally recognized as a crystal grain boundary, grains are visualized, from which the average crystal grain diameter is obtained.

When the aspect ratio of effective crystal grains, (each of which means an area surrounded by a grain boundary with 15° or more, here), of the grain-shaped tempered martensite and lower bainite exceeds 2, excellent toughness cannot be obtained. Therefore, the aspect ratio of effective crystal grains of the tempered martensite and bainite needs to be set to 2 or less.

Grains made flat in a specific direction have large anisotropy and a crack propagates along a grain boundary during a Charpy test, so that a toughness value often becomes low. Thus, the effective crystal grains need to be grains that are equiaxial as much as possible. In the present invention, the rolling direction cross section of the steel sheet is observed, and a ratio of a length in the rolling direction (L) to a length in the sheet thickness direction (T) (=L/T) is defined as the aspect ratio.

In the present invention, a sample is taken from an observation surface that is a thickness-wise cross section in parallel with the rolling direction of the steel sheet, the observation surface is electropolished, the range of ⅛ thickness to ⅜ thickness with ¼ of the sheet thickness being the center is analyzed by the EBSP-OIM method, aspect ratios of all the effective crystal grains within a visual field are measured, and an average value of the aspect ratios is brought.

In order to further improve low temperature toughness, the effective crystal grain diameter is desirably set to 10 μm or less, in addition to the condition that the tempered martensite or the lower bainite is set to the main phase. The effect of improving low temperature toughness becomes prominent when the effective crystal grain diameter is set to 10 μm or less, so that the effective crystal grain diameter is set to 10 μm or less. It is more desirably 8 μm or less. The effective crystal grain diameter to be described here means an area surrounded by a grain boundary with a crystal misorientation of 15° or more to be described by the following technique, and corresponds to a block grain diameter in terms of the martensite and the lower bainite. The lower limit of lower bainite is desirably set to 5%, further desirably set to 9%, and further desirably set to 12%. In this case, the value of a fracture appearance transition temperature (vTrs) of a Charpy test to be performed in conformity with JIS Z 2242 is likely to be −50° C. or lower.

Further, the tempered martensite and the lower bainite in the present invention desirably contain $1 \times 10^6$ (pieces/mm$^2$) or more of iron-based carbides. This is to increase low temperature toughness of a parent phase to obtain an excellent balance of strength and low temperature toughness. That is, quenched martensite is excellent in strength but poor in toughness, so that an improvement in toughness is needed. Thus, by making $1\times10^6$ (pieces/mm$^2$) or more of iron-based carbides precipitate, the toughness of the main phase can be further improved.

As a result that the present inventors examined the relationship between low temperature toughness and a number density of iron-based carbide, it became clear that setting the number density of iron-based carbide inside the tempered martensite and the lower bainite to $1\times10^6$ (pieces/mm$^2$) or more makes it possible to ensure excellent low temperature toughness. Therefore, the iron-based carbide is desirably set to $1\times10^6$ (pieces/mm$^2$) or more. It is more desirably $5\times10^6$ (pieces/mm$^2$) or more, and is further desirably $1\times10^7$ (pieces/mm$^2$) or more.

Further, the iron-based carbides that have precipitated by treatments of the present invention have a size of 300 nm or less, which is small, and most of them have precipitated in laths of the martensite and the bainite, from which it is inferred that they do not deteriorate low temperature toughness.

As a method of measuring the number density of iron-based carbide, a sample is first taken from an observation surface that is a thickness-wise cross section in parallel with the rolling direction of the steel sheet. Then, the observation surface of the sample is polished and nital etched, and the range of ⅛ thickness to ⅜ thickness with ¼ of the sheet thickness being the center is observed by a FE-SEM, to thereby measure the number density of iron-based carbides. At this time, 10 visual fields are each measured at 5000-fold magnification, to measure the number density of iron-based carbides.

[Chemical Composition of the Steel Sheet]

Next, there will be explained reasons for limiting a chemical composition of the hot-rolled steel sheet of the present invention.

Incidentally, % of each content means mass %.

(C: 0.01% to 0.2%)

C is an element contributing to a strength increase of a base metal and an improvement in bake hardenability, but is also an element generating iron-based carbide such as cementite (Fe$_3$C) to be a starting point of cracking during hole expansion. When the content of C is less than 0.01%, an effect of improving strength due to structure strengthening by a low-temperature transformation generating phase cannot be obtained. Further, when the content of C exceeds 0.2%, ductility of the steel sheet decreases, the iron-based carbide such as cementite (Fe$_3$C) to be a starting point of cracking of a secondary shear surface during punching increases, and formability such as hole expandability deteriorates. Therefore, the content of C is set to be in a range of 0.01% to 0.2%.

(Si: 2.5% or Less (not Including "0" (Zero))

Si is an element contributing to a strength increase of a base metal and can be used also as a deoxidizing material of a molten steel, to thus be preferably contained in a range of 0.001% or more according to need. However, even when greater than 2.5% of Si is contained, the effect contributing to a strength increase is saturated, so that the content of Si is set to be in a range of 2.5% or less. Further, containing 0.1% or more of Si suppresses precipitation of iron-based carbide such as cementite in the material structure and contributes to improvements in strength and hole expandability due to an increase in its content. Further, when the content of Si exceeds 2.5%, the effect of suppressing precipitation of iron-based carbide is saturated. Thus, the desirable range of the content of Si is 0.1 to 2.5%.

(Mn: 4.0% or Less (not Including "0" (Zero))

Mn is contained in order that the tempered martensite or the lower bainite should become the main phase in the steel sheet structure by solid-solution strengthening and further quench strengthening. Even when the content of Mn is set to greater than 4%, this effect is saturated. On the other hand, when the content of Mn is less than 1%, an effect of suppressing ferrite transformation and bainite transformation during cooling is not easily exhibited, so that 1% or more is desirably contained. It is desirably 1.4 to 3.0%.

(Ti: 0.03 to 0.30%)

Ti is the most important element for enabling excellent low temperature toughness and a high strength of 980 MPa or more both to be achieved. Carbonitride of Ti or solid-solution Ti delays grain growth during hot rolling, which makes it possible to make the grain diameter of the hot-rolled steel sheet fine and contributes to an improvement in low temperature toughness. Besides, Ti, in addition to a grain growth property by solid-solution N, exists as TiN, to thereby contribute to an improvement in low temperature toughness while making the crystal grain diameter fine at the time of slab heating. Further, Ti precipitates as carbonitride during rough rolling, to thereby make crystal grains fine and contribute to an improvement in low temperature toughness, so that Ti is particularly important.

It is necessary to contain 0.03% or more of Ti in order to obtain 10 μm or less of the grain diameter of the hot-rolled steel sheet. Further, even when the content of Ti exceeds 0.30%, the above-described effect is saturated and economic efficiency deteriorates. The desirable range of the content of Ti is 0.04 to 0.25%, and it is further desirably 0.05 to 0.20%.

(P: 0.10% or Less)

P is an element contained in a molten iron, segregates at grain boundaries, and decreases low temperature toughness as its content increases. Therefore, it is more desirable as the content of P is lower, and when greater than 0.10% is contained, workability and weldability are adversely affected, so that the content of P is set to 0.10% or less. In view of weldability in particular, the content of P is desirably 0.03% or less.

(S: 0.03% or Less)

S is an element contained in a molten iron, and when the content of S is too much, cracking during hot rolling is caused and further inclusions such as MnS to deteriorate hole expandability are generated. Therefore, the content of Si should be decreased as much as possible, but 0.03% or less is in an allowable range, so that the content of S is set to 0.03% or less. However, when a certain degree of hole expandability is required, the content of S is desirably 0.01% or less, and more desirably 0.005% or less.

(Al: 0.001 to 2.0%)

Al suppresses formation of coarse cementite and improves low temperature toughness. Further, Al can be used also as a deoxidizing material. However, containing Al excessively increases the number of coarse Al-based inclusions to cause deterioration of hole expandability and surface flaws. Therefore, the upper limit of the content of Al is set to 2.0%. The upper limit of the content of Al is desirably 1.5%. Incidentally, setting the content of Al to less than 0.001% is difficult, and thus this is the substantial lower limit.

(N: 0.01% or Less (not Including "0" (Zero))

N exists as TiN, to thereby contribute to an improvement in low temperature toughness while making the crystal grain diameter fine at the time of slab heating. However, there is a concern that N forms a blowhole during welding to decrease strength of a joint of a weld zone, so that it is necessary to set the content of N to 0.01% or less. On the other hand, setting the content of N to less than 0.0005% is not desirable economically, so that the content of N is desirably set to 0.0005% or more.

(O: 0.01% or Less (not Including "0" (Zero))

O forms oxides to deteriorate formability, so that its content needs to be suppressed. When the content of O exceeds 0.01% in particular, this tendency becomes prominent, so that it is necessary to set the content of O to 0.01% or less. On the other hand, setting the content of O to less than 0.001% is not preferable economically, so that the content of O is desirably set to 0.001% or more.

The basic chemical composition of the hot-rolled steel sheet of the present invention is described above, and further the following components can be contained.

(Nb: 0.01 to 0.30%)

Nb may also be contained because carbonitride of Nb or solid-solution Nb delays grain growth during hot rolling to thereby be able to make the grain diameter of the hot-rolled steel sheet fine and improve low temperature toughness. However, when the content of Nb is less than 0.01%, the above-described effect cannot be obtained sufficiently. Further, when the content of Nb exceeds 0.30%, a recrystallization temperature drops significantly, obtaining 2 or less of the aspect ratio of tempered martensite or lower bainite grains becomes difficult, and low temperature toughness deteriorates. Therefore, when Nb is contained according to need, the content of Nb is desirably set to 0.01% to 0.30%.

(One Type or Two or More Types Selected from the Group Consisting of Cu, Ni, Mo, V, and Cr)

Cu, Ni, Mo, V, and Cr suppress ferrite transformation during cooling and make the steel sheet structure become a tempered martensite or lower bainite structure, so that one type or two or more types selected from the group consisting of these elements may also be contained. Further, they are elements each having an effect of improving strength of the hot-rolled steel sheet by precipitation strengthening or solid-solution strengthening, and one type or two or more types of them may also be contained. However, when the content of each of Cu, Ni, Mo, V, and Cr is less than 0.01%, the above-described effects cannot be obtained sufficiently. Further, even when the content of Cu is greater than 2.0%, the content of Ni is greater than 2.0%, the content of Mo is greater than 1.0%, the content of V is greater than 0.3%, and the content of Cr is greater than 2.0%, the above-described effects are saturated and economic efficiency deteriorates. Thus, when Cu, Ni, Mo, V, and Cr are contained according to need, it is desirable that the content of Cu is 0.01% to 2.0%, the content of Ni is 0.01% to 2.0%, the content of Mo is 0.01% to 1.0%, the content of V is 0.01% to 0.3%, and the content of Cr is 0.01% to 2.0%.

(One Type or Two or More Types Selected from the Group Consisting of Mg, Ca, and REM)

Mg, Ca, and REM (rare-earth element) are elements controlling form of non-metal inclusions to be a starting point of destruction to cause deterioration of workability and improving workability, so that one type or two or more types of them may also be contained. When the content of each of Mg, Ca, and REM is 0.0005% or more, the effect becomes prominent, so that 0.0005% or more of each of Mg, Ca, and REM is designed to be contained. Further, even when the content of Mg is set to greater than 0.01%, the content of Ca is set to greater than 0.01%, and the content of REM is set to greater than 0.1%, the above-described effect is saturated and economic efficiency deteriorates. Thus, it is desirable that the content of Mg is set to 0.0005% to 0.01%, the content of Ca is set to 0.0005% to 0.01%, and the content of REM is set to 0.0005% to 0.1%.

(B: 0.0002 to 0.01%)

B delays ferrite transformation, to thereby contribute to making the steel sheet structure become the tempered martensite or lower bainite structure. Additionally, similarly to C, B segregates at grain boundaries and increases grain boundary strength, to thereby improve low temperature toughness. Therefore, B may also be contained in the hot-rolled steel sheet. However, setting the content of B to 0.0002% or more makes this effect become prominent, so that the lower limit is desirably set to 0.0002%. On the other hand, when the content of B exceeds 0.01%, the effect is saturated and further economic efficiency deteriorates, so that the upper limit is desirably 0.01%. It is more desirably 0.0005 to 0.005%, and further desirably 0.0007 to 0.0030%.

The above elements are contained in the hot-rolled steel sheet and the balance is iron and impurities. Here, as the impurities, ones contained in raw materials such as ore and scrap, and ones to be contained during a manufacturing process are cited as an example.

Incidentally, regarding other elements, it is confirmed that the effects of the present invention are not impaired even when 1% or less in total of one type or two or more types selected from the group consisting of Zr, Sn, Co, Zn, and W is contained. Among these elements, Sn has a risk that a flaw occurs during hot rolling, so that the content of Sn is more desirably 0.05% or less.

On the surface of the hot-rolled steel sheet explained above, a hot-dip galvanized layer is provided by a hot-dip galvanizing treatment, and further an alloyed galvanized layer is provided by an alloying treatment after the galvanizing, and thereby corrosion resistance can be improved in the hot-rolled steel sheet of the present invention having the above-described structures and composition. Further, the galvanized layer is not limited to pure zinc, and may also contain elements of Si, Mg, Zn, Al, Fe, Mn, Ca, Zr, and the like to achieve a further improvement in corrosion resistance. Even when such a galvanized layer is provided, excellent bake hardenability and low temperature toughness of the present invention are not impaired.

Further, even when any one of surface-treated layers made by organic coating film forming, film laminating, organic salts/inorganic salts treatment, non-chromium treatment, and so on is provided, the effects of the present invention can be obtained.

[Manufacturing Method of the Steel Sheet]

Next, there will be explained a manufacturing method of the hot-rolled steel sheet of the present invention.

A tempered martensite single phase having an aspect ratio of effective crystal grains being 2 or less, or the total of both tempered martensite and lower bainite is set to 90% or more for achieving excellent low temperature toughness. Further, it is desirable that the tempered martensite (and lower bainite) have an effective crystal grain diameter of 10 μm or less, and contain $1 \times 10^6$ (pieces/mm$^2$) or more of iron-based carbides, and details of manufacturing conditions for satisfying these conditions will be described below.

A manufacturing method prior to hot rolling is not particularly limited. That is, what is necessary is to adjust a composition to be the above-described composition by performing smelting in a blast furnace, an electric furnace, and so on, and then performing various secondary refinings and next, to perform casting by a method such as normal continuous casting or thin slab casting. During these times, a scrap may also be used for a raw material as long as it can be controlled within a component range of the present invention.

A cast slab is heated to a predetermined temperature when performing hot rolling. In the case of continuous casting, hot rolling may be performed after the cast slab is once cooled to low temperature, and then is reheated, or hot rolling may also be performed by heating the cast slab without cooling in particular subsequently to continuous casting.

A slab heating temperature of the hot rolling needs to be set to 1200° C. or higher. In the hot-rolled steel sheet of the present invention, coarsening of austenite grains is suppressed by using solid-solution Ti (and further Nb desirably), and therefore, it is necessary to remelt TiC (and further NbC) that have precipitated at the time of casting. When the slab heating temperature is lower than 1200° C., a long time is required in order for carbides of Nb and Ti to melt, and therefore, refining of the crystal grain diameter thereafter and the effect of improving low-temperature toughness obtained by this do not occur. Therefore, it is necessary to set the slab heating temperature to 1200° C. or higher. Further, even if the upper limit of the slab heating temperature is not particularly determined, the effects of the present invention are exhibited, but it is not economically preferable to set the heating temperature to high temperature excessively. Therefore, the slab heating temperature is desirably set to lower than 1300° C.

Rough rolling needs to be performed in which at the final stage, reduction is performed at a reduction ratio of 25% or more, a rolling temperature at the final stage is set to lower than 1100° C., and the rough rolling is completed. When the temperature at the final stage of the rough rolling is 1100° C. or higher, a growth rate of the austenite grains increases from the rough rolling to finish rolling and the grain diameter becomes coarse, resulting in that it becomes difficult to ensure excellent low temperature toughness. Further, when the rolling temperature at the final stage is lower than 1100° C. and the reduction ratio at the final stage is set to 25% or more, more excellent low temperature toughness can be ensured.

This mechanism is unclear, but it is conceivable that due to generation of carbonitride of Ti caused by strain-induced precipitation, the growth of the austenite grains from the rough rolling until the finish rolling can be suppressed, and therefore excellent low temperature toughness can be obtained by the effect of making the grain diameter fine. Further, this effect becomes prominent as the reduction ratio is larger, but when the reduction ratio is 40% or more, there is a possibility that a scale indentation flaw occurs in the steel sheet surface. Accordingly, the reduction ratio at the final stage of the rough rolling is desirably set to less than 40%.

Therefore, the rolling at the final stage needs to be performed at a reduction ratio of 25% or more and at a rolling temperature of lower than 1100° C. during the rough rolling. It is desirable that the reduction ratio is 25% or more to less than 40% and the rolling temperature is 1000° C. or higher to lower than 1100° C.

It is necessary to perform heating by a heating device so that the temperature increases by 10° C. or higher from the temperature immediately before heating by the time the finish rolling starts after completion of the rough rolling. Performing heating by 10° C. or higher enables the aspect ratio of the tempered martensite and the lower bainite to become 2 or less. This heating may be performed by an induction heating device, for example, but is not limited to this, and even when the heating is performed by using a heat retaining furnace, an energization heating device, and/or the like, this effect can be exhibited. Further, as the time until the finish rolling starts after completion of the rough rolling is longer, the heating temperature needs to be increased, so that the time until the finish rolling starts after completion of the rough rolling is desirably set to 60 seconds or shorter. Further, the time until the finish rolling starts after completion of the rough rolling is desirably 30 seconds or shorter.

The mechanism why this heating makes the aspect ratio become 2 or less is unclear, but it is conceivable that recrystallization progresses by the heating and recrystallization is completed before the finish rolling and therefore the aspect ratio of austenite decreases and the aspect ratio of the tempered martensite or the lower bainite becomes 2 or less.

A finish rolling temperature of the finish rolling (finishing temperature of the finish rolling) following the rough rolling is set to 900° C. or higher. In the hot-rolled steel sheet of the present invention, Ti (and further Nb desirably) in large amounts are contained in order to refine the grain diameter of austenite. As a result, when the finish rolling is finished in a temperature zone of lower than 900° C., austenite is not easily recrystallized and grains are extended in the rolling direction to be likely to cause toughness deterioration. Thus, the finish rolling temperature is set to 900° C. or higher. It is desirably not lower than 920° C. nor higher than 1040° C.

After the finish rolling, cooling is performed at an average cooling rate of 50° C./sec or more from the finish rolling temperature to 400° C. and coiling is performed. When this average cooling rate is less than 50° C./sec, ferrite is formed during the cooling, resulting in that it becomes difficult to obtain, by volume fraction, 90% or more of the tempered martensite single phase or the total of the tempered martensite and the lower bainite as the main phase. Therefore, it is necessary to set the average cooling rate to 50° C./sec or more. However, as long as ferrite is not formed in a cooling process, air cooling may also be performed in a temperature zone during the cooling process.

However, the average cooling rate from Bs to a lower bainite generation temperature is desirably set to 50° C./sec or more. This is to avoid formation of the upper bainite. When the average cooling rate from Bs to the lower bainite generation temperature is less than 50° C./sec, the upper bainite is formed, and there is a case that between laths of bainite, fresh martensite (martensite whose dislocation density is high) is to be formed, or retained austenite (to be the martensite whose dislocation density is high during working) to exist, and therefore bake hardenability and low temperature toughness deteriorate. Note that the Bs point is an upper bainite generation start temperature, which is determined by the components, and it is set to 550° C. as a matter of convenience. Further, the lower bainite generation temperature is also determined by the components, and it is set to 400° C. as a matter of convenience. The average cooling rate is set to 50° C./sec or more from the finish rolling temperature to 400° C., particularly from 550 to 400° C., and the average cooling rate from the finish rolling temperature to 400° C. is set to 50° C./sec or more.

Note that setting the average cooling rate from the finish rolling temperature to 400° C. to 50° C./sec or more also includes the condition that, for example, the average cooling rate from the finish rolling temperature to 550° C. is set to 50° C./sec or more and the average cooling rate from 550 to 400° C. is set to less than 50° C./sec. However, there is sometimes a case that the upper bainite is likely to be generated under this condition and greater than 10% of upper bainite is generated partially. Therefore, the average cooling rate from 550 to 400° C. is desirably set to 50° C./sec or more.

The maximum cooling rate at lower than 400° C. is desirably set to less than 50° C./sec. This is to enable the structure in which the tempered martensite or the lower bainite with the dislocation density and the number density of iron-based carbide being within the above-described ranges is the main phase. When the maximum cooling rate is 50° C./sec or more, it is not possible to make the iron-based carbide and the dislocation density fall within the above-described ranges, resulting in that high bake hardenability and low temperature toughness cannot be obtained. Therefore, the maximum cooling rate is desirably set to less than 50° C./sec. Here, the cooling at the maximum cooling rate of less than 50° C./sec at lower than 400° C. is achieved by air cooling, for example. Further, the above cooling not only means cooling but also includes isothermal holding, namely coiling at lower than 400° C. Further, the cooling rate control in this temperature zone aims to control the dislocation density and the number density of iron-based carbide in the steel sheet structure, so that even when cooling is once performed to the martensitic transformation start temperature (Ms point) or lower and thereafter the temperature is increased to perform reheating, the maximum tensile strength of 980 MPa or more, high bake hardenability, and low temperature toughness, which are the effects of the present invention, can be obtained.

The coiling temperature is set to 100° C. or higher to lower than 400° C. This is to enable the structure in which the tempered martensite single phase or the tempered martensite and the lower bainite with the number density of iron-based carbide being within the above-described range is/are the main phase. When the coiling temperature is 400° C. or higher, it is not possible to make the tempered martensite single phase or the tempered martensite and the lower bainite become the main phase. Further, when the coiling temperature is lower than 100° C., it is not possible to make the iron-based carbide fall within the above-described range, resulting in that excellent toughness cannot be obtained. Therefore, it is necessary to set the coiling temperature to 100° C. or higher to lower than 400° C.

Here, coiling is performed at the coiling temperature being in a range of 400° C. to the martensitic transformation point, to thereby generate the lower bainite, and as the temperature is higher in this temperature range, or the rate of cooling thereafter is slower, the ratio of the lower bainite becomes larger. On the other hand, when coiling is performed at the coiling temperature being in a temperature zone of the martensitic transformation point to 100° C., the tempered martensite single phase is obtained.

Incidentally, the coiling in this temperature zone aims to control the number density of iron-based carbides in the steel sheet structure, so that even when cooling is once performed to lower than 100° C. and thereafter the temperature is increased to perform reheating, the maximum tensile strength of 980 MPa or more and excellent toughness, which are the effects of the present invention, can be obtained.

In general, in order to obtain the martensite, the ferrite transformation needs to be suppressed, and the cooling at 50° C./sec or more is needed. Additionally, at low temperature, a temperature zone transits from a temperature zone whose heat transfer coefficient is relatively low and where it is not easily cooled, called a film boiling region to a temperature zone whose heat transfer coefficient is large and where it is cooled easily, called a nucleate boiling temperature region. Therefore, when the temperature zone of lower than 400° C. is set to a cooling stop temperature, the coiling temperature fluctuates easily, and with the fluctuation, the quality of material also changes. Therefore, there was often a case that the normal coiling temperature is set to higher than 400° C. or coiling is performed at room temperature.

As a result, it is inferred that it was conventionally difficult to find that the maximum tensile strength of 980 MPa or more and excellent low temperature toughness can be ensured simultaneously by the coiling from 100 to lower than 400° C. as the present invention.

Incidentally, it is desirable to perform skin pass rolling at a reduction ratio of 0.1% to 2% after all the processes are finished for the purpose of correcting the steel sheet shape and achieving an improvement in ductility by introduction of mobile dislocation. Further, after all the processes are finished, pickling may be performed on the obtained hot-rolled steel sheet according to need for the purpose of removing scales attached to the surface of the obtained hot-rolled steel sheet. Furthermore, it is also possible to perform skin pass or cold rolling at a reduction ratio of 10% or less inline or offline on the obtained hot-rolled steel sheet after the pickling.

The steel sheet of the present invention is manufactured by undergoing continuous casting, rough rolling, and finish rolling that are the normal hot-rolling process, and as long as the manufacturing conditions prescribed above are satisfied, the other manufacturing conditions are performed under normal conditions, thereby making it possible to ensure the maximum tensile strength of 980 MPa or more and low temperature toughness, which are the effects of the present invention.

Further, even if a heat treatment is performed in a temperature range of 100 to 600° C. online or offline for the purpose of precipitation of carbides after the hot-rolled steel sheet is once manufactured, it is possible to ensure excellent low temperature toughness and the maximum tensile strength of 980 MPa or more, which are the effects of the present invention.

Incidentally, the steel sheet with the maximum tensile strength of 980 MPa or more in the present invention indicates a steel sheet whose maximum tensile stress measured by a tensile test performed in conformity with JIS Z 2241 by using a JIS No. 5 test piece cut out in a vertical direction relative to the rolling direction of hot rolling is 980 MPa or more.

Further, the steel sheet excellent in toughness at low temperature indicates a steel sheet whose fracture appearance transition temperature (vTrs) of a Charpy test performed in conformity with JIS Z 2242 is −40° C., desirably −50° C. or lower, and further desirably −60° C. or lower. In the present invention, the target steel sheet is used for automobiles mainly, so that its sheet thickness becomes 3 mm or so in many cases. Thus, when these evaluations are performed, the surface of the hot-rolled steel sheet is ground, and the steel sheet is worked into a 2.5 mm subsize test piece and the evaluations are performed.

EXAMPLES

The technical contents of the present invention will be explained while citing examples of the present invention. Note that conditions in examples are condition examples employed for confirming the applicability and effects of the present invention and the present invention is not limited to these examples. The present invention can employ various conditions as long as the object of the present invention is achieved without departing from the spirit of the present invention.

Hereinafter, there will be explained results of examinations using steels A to S satisfying the condition of the composition in the present invention and steels a to k not satisfying the condition of the composition in the present invention illustrated in Table 1 as examples. Note that specifically La and Ce are used as REM.

After these steels were cast, they were directly heated to a temperature range of 1030° C. to 1300° C., or they were once cooled to room temperature and then reheated to the temperature range, and thereafter hot rolling was performed under each of conditions in Table 2-1 and Table 2-2, finish rolling was performed at 760 to 1030° C., cooling and coiling were performed under each of the conditions illustrated in Table 2-1 and Table 2-2, and hot-rolled steel sheets each having a sheet thickness of 3.2 mm were obtained. Thereafter, pickling was performed, and then skin pass rolling at a reduction ratio of 0.5% was performed.

Various test pieces were cut out of the obtained hot-rolled steel sheets, and a material test, a structure observation, and so on were performed.

As the tensile test, a JIS No. 5 test piece was cut out in a direction vertical to the rolling direction, and the test was performed in conformity with JIS Z 2242.

As measurement of a bake hardening amount, a JIS No. 5 test piece was cut out in a direction vertical to the rolling direction, and the measurement was performed in conformity with the method of a paint bake hardening test described in an appendix of JIS G 3135. A pre-strain amount was set to 2%, and a heat treatment condition was set to 170° C.×20 minutes.

The Charpy test was performed in conformity with JIS Z 2242, and the fracture appearance transition temperature was measured. The sheet thickness of the steel sheet of the present invention was less than 10 mm, so that front and rear surfaces of the obtained hot-rolled steel sheets were ground to a thickness of 2.5 mm, and thereafter, the Charpy test was performed.

As for some of the steel sheets, the hot-rolled steel sheets were heated to 660 to 720° C. and were subjected to a hot-dip galvanizing treatment or an alloying heat treatment at 540 to 580° C. after the galvanizing treatment, and hot-dip galvanized steel sheets (GI) or alloyed hot-dip galvanized steel sheets (GA) were obtained, and thereafter, a material test was performed.

The microstructure observation was performed by the above-described method, and the volume fraction of each structure, the number density of iron-based carbide, the effective crystal grain diameter, and the aspect ratio were measured.

Results are illustrated in Table 3-1 and Table 3-2.

It is found that only ones satisfying the conditions of the present invention have a maximum tensile strength of 980 MPa or more and excellent low-temperature toughness.

On the other hand, as for Steels A-3, B-4, E-4, J-4, M-4, and S-4, where the slab heating temperature was lower than 1200° C., carbides of Ti and Nb that precipitated during casting did not easily melt, so that even if the other hot-rolling conditions were set to be in the ranges of the present invention, it was not possible to make the structural fraction and the effective crystal grain diameter fall within the ranges of the present invention and the strength and low temperature toughness deteriorated.

As for Steels A-4, E-5, J-5, and M-5, the rough rolling temperature was 1100° C. or higher, the grain diameter of austenite became too coarse, and the crystal grain diameter of the tempered martensite after transformation or the lower bainite also became coarse, and therefore the low temperature toughness deteriorated.

As for Steels B-5, E-5, J-5, and S-5, the reduction ratio at the final stage of the rough rolling was less than 25%, it was not possible to make carbonitride of Ti caused by strain-induced precipitation appear and to suppress coarsening of the grain diameter of austenite, and therefore the low temperature toughness deteriorated.

As for Steels A-5, B-6, J-6, M-6, and S-6, heating was not performed before the finish rolling after the rough rolling was completed, and therefore the recrystallization of austenite was not able to progress and the aspect ratio of the effective crystal grains of the tempered martensite after transformation or the lower bainite became greater than 2, and thereby the low temperature toughness deteriorated.

As for Steels A-6, B-7, J-7, M-7, and S-7, the finish rolling temperature was too low and rolling was performed in a non-recrystallized austenite region, and thereby grains were extended in the rolling direction, resulting in that the aspect ratio was large and the low temperature toughness deteriorated.

As for Steels A-7, B-8, J-8, M-8, and S-8, the average cooling rate from the finish rolling temperature to 400° C. was less than 50° C./sec, ferrite in large amounts was formed during cooling to make it difficult to ensure strength, and an interface between the ferrite and martensite became a starting point of destruction, and therefore the low temperature toughness deteriorated.

As for Steel A-8, the coiling temperature was 480° C., which was high, and the steel sheet structure became an upper bainite structure, and therefore it became difficult to ensure the maximum tensile strength of 980 MPa or more, and coarse iron-based carbides that precipitated between laths existing in the upper bainite structure became a starting point of destruction, resulting in that the low temperature toughness deteriorated.

As for Steels B-9 and J-9, the coiling temperature was 580 to 620° C., which was high, and the steel sheet structure became a mixed structure of ferrite and pearlite. As a result, it was difficult to ensure the maximum tensile strength of 980 MPa or more, and an interface between the ferrite in the pearlite and iron-based carbide became a starting point of destruction, and therefore the low temperature toughness deteriorated.

As for Steel M-9, the coiling temperature was room temperature, which was low, and the steel sheet structure became tempered martensite and fresh martensite, and therefore the fresh martensite became a starting point of destruction, resulting in that the low temperature toughness deteriorated.

Further, as illustrated in Steels A-9 and 10, B-10 and 11, E-6 and 7, J-10 and 11, M-10 and 11, and S-9 and 10, it was possible to confirm that the quality of material of the present invention was able to be ensured even when the hot-dip galvanizing treatment or the alloyed hot-dip galvanizing treatment was performed.

On the other hand, as for Steels a to k, where the steel sheet components did not satisfy the ranges of the present invention, it was not possible to obtain the maximum tensile strength of 980 MPa or more and excellent low temperature toughness that were determined in the present invention.

Incidentally, when a sample was fabricated under the same condition as that of Steel A-3 except that the cooling rate from 550 to 400° C. was set to 45° C./s, the average cooling rate from the finish rolling temperature to 400° C.

was 73° C./s, and therefore the average cooling rate satisfied 50° C./s or more. However, the upper bainite became 10% or more and variations were caused also in the quality of material. Further, when a sample was tried to be fabricated under the same condition as that of Steel A-1 except that the content of 0 exceeded 0.01 mass %, there was a problem in workability, and it was possible to confirm that it cannot be treated as a product.

TABLE 1

CHEMICAL COMPOSITION (MASS %)

| STEEL TYPE | C | Si | Mn | P | S | Al | N | 0 | Ti | Nb | OTHERS | REMARK |
|---|---|---|---|---|---|---|---|---|---|---|---|---|
| A | 0.054 | 1.32 | 2.34 | 0.009 | 0.0009 | 0.029 | 0.0024 | 0.0022 | 0.192 | — | — | COMPOSITION |
| B | 0.063 | 1.16 | 2.91 | 0.012 | 0.0024 | 0.033 | 0.0021 | 0.0016 | 0.103 | 0.021 | — | RANGE |
| C | 0.069 | 0.76 | 2.31 | 0.015 | 0.0023 | 0.024 | 0.0021 | 0.0016 | 0.062 | 0.031 | Cu = 0.23 | SATISFIED |
| D | 0.07 | 0.59 | 2.39 | 0.007 | 0.0016 | 0.018 | 0.0029 | 0.002 | 0.049 | 0.039 | Ni = 0.42 | |
| E | 0.069 | 0.79 | 1.8 | 0.011 | 0.0032 | 0.018 | 0.0025 | 0.0022 | 0.034 | 0.097 | Mo = 0.38 | |
| F | 0.059 | 1.97 | 2.22 | 0.008 | 0.0034 | 0.021 | 0.0024 | 0.0011 | 0.054 | 0.015 | V = 0.046 | |
| G | 0.068 | 1.06 | 1.78 | 0.006 | 0.0012 | 0.032 | 0.0025 | 0.0027 | 0.101 | — | Cr = 0.62 | |
| H | 0.082 | 0.64 | 2.28 | 0.009 | 0.0005 | 0.006 | 0.0027 | 0.0021 | 0.089 | — | Mg = 0.0014 | |
| I | 0.06 | 0.54 | 2.3 | 0.014 | 0.0038 | 0.01 | 0.0032 | 0.0016 | 0.102 | — | Ca = 0.0008 | |
| J | 0.073 | 0.08 | 2.53 | 0.018 | 0.0026 | 1.08 | 0.0072 | 0.0009 | 0.052 | 0.012 | B = 0.0028 | |
| K | 0.071 | 0.86 | 2.31 | 0.007 | 0.002 | 0.024 | 0.0018 | 0.0019 | 0.037 | 0.01 | REM = 0.0038 | |
| L | 0.103 | 0.89 | 2.27 | 0.009 | 0.003 | 0.017 | 0.003 | 0.0016 | 0.086 | — | — | |
| M | 0.109 | 0.92 | 2.07 | 0.012 | 0.0024 | 0.034 | 0.032 | 0.0022 | 0.049 | 0.025 | B = 0.0013 | |
| N | 0.107 | 0.85 | 1.64 | 0.011 | 0.0027 | 0.016 | 0.0016 | 0.0018 | 0.099 | — | Cr = 1.26 | |
| 0 | 0.111 | 0.69 | 2.31 | 0.016 | 0.0007 | 0.01 | 0.0027 | 0.0021 | 0.095 | — | Ca = 0.0022 | |
| P | 0.114 | 0.13 | 1.89 | 0.012 | 0.0025 | 0.642 | 0.0026 | 0.0012 | 0.071 | 0.016 | Mo = 0.19, B = 0.0009 | |
| Q | 0.157 | 1.22 | 2.34 | 0.01 | 0.0018 | 0.03 | 0.003 | 0.0023 | 0.048 | 0.009 | B = 0.0009 | |
| R | 0.161 | 1.08 | 2.31 | 0.009 | 0.0021 | 0.028 | 0.0024 | 0.0018 | 0.062 | — | — | |
| S | 0.200 | 0.87 | 2.11 | 0.013 | 0.0032 | 0.02 | 0.0023 | 0.0021 | 0.067 | 0.002 | Cr = 0.29 | |
| a | <u>0.002</u> | 0.34 | 1.32 | 0.062 | 0.0056 | 0.034 | 0.0033 | 0.0032 | 0.039 | 0.042 | — | COMPOSITION |
| b | <u>0.62</u> | 1.32 | 2.16 | 0.013 | 0.0034 | 0.024 | 0.0021 | 0.0017 | 0.051 | 0.029 | — | RANGE NOT |
| c | 0.084 | <u>3.09</u> | 2.34 | 0.021 | 0.0029 | 0.029 | 0.0023 | 0.0016 | 0.086 | 0.012 | — | SATISFIED |
| d | 0.072 | 0.86 | <u>5.61</u> | 0.032 | 0.0032 | 0.021 | 0.0019 | 0.0021 | 0.105 | — | — | |
| f | 0.063 | 0.84 | 2.13 | <u>0.109</u> | 0.0018 | 0.034 | 0.0035 | 0.0018 | 0.079 | 0.024 | — | |
| g | 0.065 | 0.73 | 1.89 | 0.018 | <u>0.051</u> | 0.013 | 0.0031 | 0.002 | 0.099 | 0.013 | — | |
| h | 0.073 | 0.69 | 1.99 | 0.008 | 0.0016 | <u>2.462</u> | 0.003 | 0.0043 | 0.104 | 0.011 | — | |
| i | 0.084 | 0.75 | 2.05 | 0.013 | 0.0025 | 0.046 | <u>0.049</u> | 0.0026 | 0.076 | 0.02 | — | |
| j | 0.091 | 0.81 | 2.13 | 0.016 | 0.0036 | 0.023 | 0.0025 | 0.0027 | <u>0.014</u> | — | — | |
| k | 0.076 | 0.82 | 1.97 | 0.009 | 0.0045 | 0.034 | 0.0029 | 0.0023 | <u>0.406</u> | 0.023 | — | |
| l | 0.076 | 0.82 | 1.97 | 0.009 | 0.0045 | 0.034 | 0.0029 | 0.0023 | 0.076 | <u>0.351</u> | — | |

EACH UNDERLINE MEANS BEING OUT OF THE RANGE OF THE PRESENT INVENTION.

TABLE 2-1

HOT ROLLING CONDITIONS

| STEEL | SLAB HEATING TEMPERATURE (° C.) | ROUGH ROLLING FINAL STAGE TEMPERATURE (° C.) | ROUGH ROLLING FINAL STAGE REDUCTION RATIO (%) | HEATING TEMPERATURE FROM ROUGH TO FINISH (° C.) | FINISH ROLLING TEMPERATURE (° C.) | AVERAGE COOLING RATE FROM FINISH TO 400° C. (° C./s) |
|---|---|---|---|---|---|---|
| A-1 | 1240 | 1050 | 29 | 30 | 960 | 50 |
| A-2 | 1230 | 1040 | 31 | 20 | 940 | 50 |
| A-3 | <u>1030</u> | 960 | 26 | 70 | 910 | 100 |
| A-4 | 1220 | <u>1110</u> | 27 | 20 | 960 | 70 |
| A-5 | 1280 | 1020 | 33 | <u>0</u> | 950 | 60 |
| A-6 | 1240 | 990 | 35 | 20 | <u>820</u> | 70 |
| A-7 | 1230 | 1030 | 30 | 30 | 940 | <u>20</u> |
| A-8 | 1250 | 1050 | 36 | 40 | 970 | 50 |
| A-9 | 1240 | 1020 | 40 | 50 | 950 | 60 |
| A-10 | 1240 | 1050 | 28 | 20 | 950 | 60 |
| B-1 | 1260 | 1060 | 27 | 10 | 950 | 50 |
| B-2 | 1240 | 1040 | 37 | 20 | 940 | 60 |
| B-3 | 1250 | 1030 | 39 | 40 | 950 | 120 |
| B-4 | <u>1060</u> | 960 | 41 | 60 | 900 | 60 |
| B-5 | 1240 | 1010 | <u>23</u> | 60 | 950 | 70 |
| B-6 | 1250 | 1030 | 25 | <u>0</u> | 980 | 60 |
| B-7 | 1230 | 1000 | 29 | 10 | <u>810</u> | 50 |
| B-8 | 1260 | 1050 | 28 | 30 | 960 | <u>15</u> |
| B-9 | 1230 | 1010 | 34 | 60 | 950 | 70 |
| B-10 | 1260 | 1030 | 29 | 70 | 980 | 60 |
| B-11 | 1260 | 1090 | 33 | 10 | 980 | 60 |
| C-1 | 1250 | 1050 | 32 | 40 | 970 | 60 |
| D-1 | 1270 | 1030 | 36 | 30 | 940 | 60 |
| E-1 | 1260 | 1090 | 34 | 60 | 1030 | 70 |
| E-2 | 1250 | 1030 | 40 | 90 | 1000 | 120 |

TABLE 2-1-continued

HOT ROLLING CONDITIONS

| | | | | | | |
|---|---|---|---|---|---|---|
| E-3 | 1250 | 1070 | 29 | 70 | 1020 | 100 |
| E-4 | <u>1060</u> | 950 | 27 | 80 | 910 | 60 |
| E-5 | 1240 | <u>1100</u> | <u>22</u> | 10 | 950 | 120 |
| E-6 | 1260 | 1090 | 26 | 30 | 1000 | 60 |
| E-7 | 1260 | 1050 | 29 | 70 | 1000 | 60 |
| F-1 | 1240 | 1030 | 27 | 10 | 920 | 60 |
| G-1 | 1300 | 1080 | 27 | 10 | 950 | 50 |
| H-1 | 1250 | 990 | 37 | 60 | 930 | 60 |
| I-1 | 1260 | 1040 | 39 | 40 | 960 | 50 |
| J-1 | 1250 | 1050 | 36 | 20 | 950 | 80 |
| J-2 | 1270 | 1030 | 34 | 60 | 970 | 60 |
| J-3 | 1230 | 1010 | 40 | 70 | 960 | 120 |
| J-4 | <u>1090</u> | 930 | 38 | 90 | 900 | 90 |
| J-5 | 1230 | <u>1100</u> | <u>20</u> | 20 | 950 | 70 |
| J-6 | 1250 | 1080 | 26 | <u>0</u> | 970 | 80 |
| J-7 | 1240 | 980 | 27 | 10 | <u>830</u> | 50 |

| STEEL | COOLING RATE FROM 550° C. TO 400° C. (° C./s) | COILING TEMPERATURE (° C.) | REMARK |
|---|---|---|---|
| A-1 | 73 | 200 | INVENTION EXAMPLE |
| A-2 | 73 | 330 | INVENTION EXAMPLE |
| A-3 | 123 | 250 | <u>COMPARATIVE EXAMPLE</u> |
| A-4 | 93 | 340 | <u>COMPARATIVE EXAMPLE</u> |
| A-5 | 83 | 360 | <u>COMPARATIVE EXAMPLE</u> |
| A-6 | 93 | 240 | <u>COMPARATIVE EXAMPLE</u> |
| A-7 | <u>43</u> | 290 | <u>COMPARATIVE EXAMPLE</u> |
| A-8 | 73 (COOLING RATE TO 500° C.) | <u>480</u> | <u>COMPARATIVE EXAMPLE</u> |
| A-9 | 83 | 350 | INVENTION EXAMPLE |
| A-10 | 83 | 390 | INVENTION EXAMPLE |
| B-1 | 73 | 260 | INVENTION EXAMPLE |
| B-2 | 83 | 390 | INVENTION EXAMPLE |
| B-3 | 143 | 220 | INVENTION EXAMPLE |
| B-4 | 83 | 190 | <u>COMPARATIVE EXAMPLE</u> |
| B-5 | 93 | 330 | <u>COMPARATIVE EXAMPLE</u> |
| B-6 | 83 | 310 | <u>COMPARATIVE EXAMPLE</u> |
| B-7 | 73 | 280 | <u>COMPARATIVE EXAMPLE</u> |
| B-8 | <u>38</u> | 290 | <u>COMPARATIVE EXAMPLE</u> |
| B-9 | — | <u>580</u> | <u>COMPARATIVE EXAMPLE</u> |
| B-10 | 83 | 370 | INVENTION EXAMPLE |
| B-11 | 83 | 330 | INVENTION EXAMPLE |
| C-1 | 83 | 310 | INVENTION EXAMPLE |
| D-1 | 83 | 260 | INVENTION EXAMPLE |
| E-1 | 93 | 150 | INVENTION EXAMPLE |
| E-2 | 143 | 340 | INVENTION EXAMPLE |
| E-3 | 123 | 240 | INVENTION EXAMPLE |
| E-4 | 83 | 190 | <u>COMPARATIVE EXAMPLE</u> |
| E-5 | 143 | 340 | <u>COMPARATIVE EXAMPLE</u> |
| E-6 | 83 | 370 | INVENTION EXAMPLE |
| E-7 | 83 | 160 | INVENTION EXAMPLE |
| F-1 | 83 | 180 | INVENTION EXAMPLE |
| G-1 | 73 | 340 | INVENTION EXAMPLE |
| H-1 | 83 | 260 | INVENTION EXAMPLE |
| I-1 | 73 | 220 | INVENTION EXAMPLE |
| J-1 | 103 | 240 | INVENTION EXAMPLE |
| J-2 | 83 | 390 | INVENTION EXAMPLE |
| J-3 | 143 | 220 | INVENTION EXAMPLE |
| J-4 | 113 | 330 | <u>COMPARATIVE EXAMPLE</u> |
| J-5 | 93 | 390 | <u>COMPARATIVE EXAMPLE</u> |
| J-6 | 103 | 270 | <u>COMPARATIVE EXAMPLE</u> |
| J-7 | 73 | 380 | <u>COMPARATIVE EXAMPLE</u> |

EACH UNDERLINE MEANS BEING OUT OF THE RANGE OF THE PRESENT INVENTION.

TABLE 2-2

| STEEL | SLAB HEATING TEMPERATURE (° C.) | ROUGH ROLLING FINAL STAGE TEMPERATURE (° C.) | ROUGH ROLLING FINAL STAGE REDUCTION RATIO (%) | HEATING TEMPERATURE FROM ROUGH TO FINISH (° C.) | FINISH ROLLING TEMPERATURE (° C.) | AVERAGE COOLING RATE FROM FINISH TO 400° C. (° C./s) | COOLING RATE FROM 550° C. TO 400° C. (° C./s) | COILING TEMPERATURE (° C.) | REMARK |
|---|---|---|---|---|---|---|---|---|---|
| J-8 | 1250 | 1020 | 32 | 20 | 920 | <u>10</u> | 33 | 210 | <u>COMPARATIVE EXAMPLE</u> |
| J-9 | 1260 | 1040 | 31 | 10 | 930 | 80 | — | <u>620</u> | <u>COMPARATIVE EXAMPLE</u> |
| J-10 | 1230 | 1040 | 33 | 20 | 940 | 70 | 93 | 350 | INVENTION EXAMPLE |
| J-11 | 1230 | 1030 | 37 | 30 | 940 | 70 | 93 | 350 | INVENTION EXAMPLE |
| K-1 | 1240 | 1060 | 40 | 30 | 970 | 60 | 83 | 330 | INVENTION EXAMPLE |
| L-1 | 1230 | 990 | 35 | 80 | 950 | 60 | 83 | 360 | INVENTION EXAMPLE |
| M-1 | 1280 | 1080 | 29 | 20 | 980 | 70 | 93 | 290 | INVENTION EXAMPLE |
| M-2 | 1230 | 1030 | 28 | 30 | 940 | 80 | 103 | 330 | INVENTION EXAMPLE |
| M-3 | 1250 | 1060 | 37 | 10 | 950 | 60 | 83 | 160 | INVENTION EXAMPLE |
| M-4 | <u>1100</u> | 990 | 33 | 40 | 910 | 90 | 113 | 140 | <u>COMPARATIVE EXAMPLE</u> |
| M-5 | 1240 | <u>1130</u> | 35 | 30 | 930 | 80 | 103 | 190 | <u>COMPARATIVE EXAMPLE</u> |
| M-6 | 1210 | 1090 | 33 | <u>0</u> | 980 | 50 | 73 | 260 | <u>COMPARATIVE EXAMPLE</u> |
| M-7 | 1250 | 920 | 34 | 20 | <u>760</u> | 100 | 123 | 230 | <u>COMPARATIVE EXAMPLE</u> |
| M-8 | 1260 | 1000 | 29 | 60 | 940 | <u>20</u> | 43 | 240 | <u>COMPARATIVE EXAMPLE</u> |
| M-9 | 1230 | 1090 | 35 | 30 | 960 | 70 | 93 | <u>ROOM TEMPERATURE</u> | <u>COMPARATIVE EXAMPLE</u> |
| M-10 | 1240 | 1080 | 37 | 10 | 950 | 80 | 103 | 310 | INVENTION EXAMPLE |
| M-11 | 1240 | 1080 | 28 | 20 | 950 | 80 | 103 | 310 | INVENTION EXAMPLE |
| N-1 | 1250 | 1090 | 27 | 10 | 980 | 80 | 103 | 300 | INVENTION EXAMPLE |
| O-1 | 1240 | 1090 | 32 | 20 | 950 | 60 | 83 | 290 | INVENTION EXAMPLE |
| P-1 | 1240 | 1050 | 33 | 30 | 960 | 60 | 83 | 270 | INVENTION EXAMPLE |
| Q-1 | 1240 | 1020 | 36 | 40 | 940 | 60 | 83 | 350 | INVENTION EXAMPLE |
| R-1 | 1260 | 1050 | 39 | 20 | 950 | 70 | 93 | 340 | INVENTION EXAMPLE |
| S-1 | 1230 | 1080 | 40 | 10 | 970 | 80 | 103 | 290 | INVENTION EXAMPLE |
| S-2 | 1220 | 1030 | 26 | 70 | 980 | 60 | 83 | 360 | INVENTION EXAMPLE |
| S-3 | 1270 | 1070 | 29 | 30 | 940 | 80 | | | |
| S-4 | <u>1060</u> | 1060 | 27 | 10 | 950 | 70 | | | |
| S-5 | 1230 | 1050 | <u>21</u> | 40 | 970 | 70 | | | |
| S-6 | 1220 | 1070 | 33 | <u>0</u> | 990 | 60 | | | |
| S-7 | 1230 | 1030 | 32 | 10 | <u>830</u> | 150 | | | |
| S-8 | 1250 | 1060 | 36 | 20 | 960 | <u>10</u> | | | |
| S-9 | 1280 | 1070 | 34 | 10 | 960 | 80 | | | |
| S-10 | 1270 | 1040 | 29 | 30 | 950 | 80 | | | |
| a-1 | 1210 | 1010 | 30 | 30 | 920 | 60 | | | |
| b-1 | 1260 | 1080 | 29 | 20 | 950 | 80 | | | |
| c-1 | 1240 | 1020 | 33 | 40 | 940 | 60 | | | |
| d-1 | 1230 | 1080 | 36 | 30 | 930 | 70 | | | |
| f-1 | 1250 | 1090 | 35 | 50 | 1020 | 100 | | | |
| g-1 | 1240 | 1090 | 28 | 10 | 940 | 60 | | | |
| h-1 | 1200 | 1030 | 37 | 20 | 930 | 80 | | | |
| i-1 | 1230 | 1000 | 35 | 70 | 950 | 70 | | | |
| j-1 | 1200 | 1010 | 36 | 30 | 920 | 60 | | | |
| k-1 | 1240 | 1040 | 33 | 10 | 920 | 80 | | | |
| l-1 | 1220 | 1030 | 27 | 70 | 980 | 80 | | | |

TABLE 2-2-continued

| | | | | |
|---|---|---|---|---|
| | S-3 | 103 | 200 | INVENTION EXAMPLE |
| | S-4 | 93 | 190 | COMPARATIVE EXAMPLE |
| | S-5 | 93 | 230 | COMPARATIVE EXAMPLE |
| | S-6 | 83 | 210 | COMPARATIVE EXAMPLE |
| | S-7 | 173 | 240 | COMPARATIVE EXAMPLE |
| | S-8 | 33 | 330 | COMPARATIVE EXAMPLE |
| | S-9 | 103 | 290 | INVENTION EXAMPLE |
| | S-10 | 103 | 290 | INVENTION EXAMPLE |
| | a-1 | 83 | 360 | COMPARATIVE STEEL |
| | b-1 | 103 | 340 | COMPARATIVE STEEL |
| | c-1 | 83 | 310 | COMPARATIVE STEEL |
| | d-1 | 93 | 290 | COMPARATIVE STEEL |
| | f-1 | 123 | 260 | COMPARATIVE STEEL |
| | g-1 | 83 | 270 | COMPARATIVE STEEL |
| | h-1 | 103 | 310 | COMPARATIVE STEEL |
| | i-1 | 93 | 330 | COMPARATIVE STEEL |
| | j-1 | 83 | 310 | COMPARATIVE STEEL |
| | k-1 | 103 | 320 | COMPARATIVE STEEL |
| | l-1 | 103 | 280 | COMPARATIVE STEEL |

EACH UNDERLINE MEANS BEING OUT OF THE RANGE OF THE PRESENT INVENTION.

TABLE 3-1

MICROSTRUCTURE AND MECHANICAL PROPERTIES

| STEEL | STEEL TYPE * | TEMPERED MARTENSITE | LOWER BAINITE | REMAINING STRUCTURE | OTHER STRUCTURES | NUMBER DENSITY OF IRON-BASED CARBIDE ×$10^6$ (1/mm$^2$) |
|---|---|---|---|---|---|---|
| A-1 | HR | 100 | 0 | 0 | — | 3.4 |
| A-2 | HR | 71 | 29 | 0 | — | 6.3 |
| A-3 | HR | 69 | 0 | 31 | FERRITE | 5.2 |
| A-4 | HR | 81 | 19 | 0 | — | 6.8 |
| A-5 | HR | 100 | 0 | 0 | — | 7.1 |
| A-6 | HR | 100 | 0 | 0 | — | 4.8 |
| A-7 | HR | 66 | 0 | 34 | FERRITE | 5.9 |
| A-8 | HR | 0 | 0 | 100 | UPPER BAINITE | 0 |
| A-9 | G I | 100 | 0 | 0 | — | 4.5 |
| A-10 | G A | 100 | 0 | 0 | — | 6.8 |
| B-1 | HR | 90 | 0 | 10 | FERRITE | 3.7 |
| B-2 | HR | 25 | 75 | 0 | — | 3.9 |
| B-3 | HR | 88 | 12 | 0 | — | 6.9 |
| B-4 | HR | 66 | 0 | 34 | FERRITE | 4.2 |
| B-5 | HR | 74 | 26 | 0 | — | 5.7 |
| B-6 | HR | 100 | 0 | 0 | — | 4.9 |
| B-7 | HR | 100 | 0 | 0 | — | 4.8 |
| B-8 | HR | 27 | 0 | 73 | FERRITE | 4.3 |
| B-9 | HR | 0 | 0 | 100 | FERRITE, PEARLITE | 0 |
| B-10 | G I | 100 | 0 | 0 | — | 3.5 |
| B-11 | G A | 100 | 0 | 0 | — | 3.4 |
| C-1 | HR | 100 | 0 | 0 | — | 4.9 |
| D-1 | HR | 100 | 0 | 0 | — | 3.7 |
| E-1 | HR | 100 | 0 | 0 | — | 5.3 |
| E-2 | HR | 71 | 29 | 0 | — | 4.5 |
| E-3 | HR | 91 | 9 | 0 | — | 7.6 |
| E-4 | HR | 80 | 0 | 20 | FERRITE | 4.6 |
| E-5 | HR | 83 | 17 | 0 | — | 5.8 |
| E-6 | G I | 100 | 0 | 0 | — | 5.5 |
| E-7 | G A | 100 | 0 | 0 | — | 5.8 |
| F-1 | HR | 100 | 0 | 0 | — | 5.1 |
| G-1 | HR | 100 | 0 | 0 | — | 4 |
| H-1 | HR | 100 | 0 | 0 | — | 4.5 |
| I-1 | HR | 100 | 0 | 0 | — | 5.3 |
| J-1 | HR | 100 | 0 | 0 | — | 4.2 |
| J-2 | HR | 53 | 47 | 0 | — | 3.4 |
| J-3 | HR | 91 | 9 | 0 | — | 5.9 |
| J-4 | HR | 67 | 0 | 33 | FERRITE | 3.9 |
| J-5 | HR | 76 | 24 | 0 | — | 4.6 |
| J-6 | HR | 100 | 0 | 0 | — | 5.1 |
| J-7 | HR | 100 | 0 | 0 | — | 4.3 |

| STEEL | EFFECTIVE CRYSTAL GRAIN DIAMETER (μm) | ASPECT RATIO | YP (MPa) | TS (MPa) | El (%) | vTrs (° C.) | REMARK |
|---|---|---|---|---|---|---|---|
| A-1 | 7.8 | 1.2 | 782 | 1023 | 12 | −60 | INVENTION EXAMPLE |
| A-2 | 8.3 | 1.3 | 934 | 1007 | 13 | −70 | INVENTION EXAMPLE |

TABLE 3-1-continued

MICROSTRUCTURE AND MECHANICAL PROPERTIES

| ID | | | | | | | | |
|---|---|---|---|---|---|---|---|---|
| A-3 | <u>12.9</u> | 1.1 | 692 | <u>892</u> | 13 | <u>50</u> | COMPARATIVE EXAMPLE |
| A-4 | <u>11.3</u> | 1 | 746 | 1057 | 9 | <u>−20</u> | COMPARATIVE EXAMPLE |
| A-5 | 7.3 | <u>2.5</u> | 989 | 1046 | 10 | <u>−10</u> | COMPARATIVE EXAMPLE |
| A-6 | 5.5 | <u>2.3</u> | 957 | 1093 | 9 | <u>0</u> | COMPARATIVE EXAMPLE |
| A-7 | 7.2 | 1.4 | 705 | <u>924</u> | 14 | <u>30</u> | COMPARATIVE EXAMPLE |
| A-8 | 9.2 | 0.8 | 576 | <u>824</u> | 15 | <u>−10</u> | COMPARATIVE EXAMPLE |
| A-9 | 7.7 | 1 | 852 | 998 | 14 | −50 | INVENTION EXAMPLE |
| A-10 | 6.6 | 1.1 | 880 | 983 | 14 | −50 | INVENTION EXAMPLE |
| B-1 | 6.5 | 1.1 | 769 | 1027 | 12 | −50 | INVENTION EXAMPLE |
| B-2 | 7.2 | 1.3 | 882 | 1019 | 13 | −60 | INVENTION EXAMPLE |
| B-3 | 6.5 | 1 | 949 | 1004 | 13 | −70 | INVENTION EXAMPLE |
| B-4 | <u>12.7</u> | 1.2 | 672 | <u>867</u> | 14 | <u>30</u> | COMPARATIVE EXAMPLE |
| B-5 | <u>5.1</u> | 0.9 | 752 | 1093 | 9 | <u>0</u> | COMPARATIVE EXAMPLE |
| B-6 | 8.1 | <u>2.9</u> | 934 | 1095 | 12 | <u>−20</u> | COMPARATIVE EXAMPLE |
| B-7 | 4.8 | <u>2.5</u> | 912 | 1055 | 10 | <u>−20</u> | COMPARATIVE EXAMPLE |
| B-8 | 6.4 | 1.1 | 558 | <u>792</u> | 18 | <u>−30</u> | COMPARATIVE EXAMPLE |
| B-9 | 7.4 | 1.2 | 736 | <u>842</u> | 15 | <u>−10</u> | COMPARATIVE EXAMPLE |
| B-10 | 6.7 | 1 | 899 | 1002 | 14 | −50 | INVENTION EXAMPLE |
| B-11 | 6.7 | 1.1 | 948 | 984 | 14 | −50 | INVENTION EXAMPLE |
| C-1 | 6.3 | 1 | 773 | 1035 | 13 | −50 | INVENTION EXAMPLE |
| D-1 | 6.5 | 1.3 | 781 | 1042 | 12 | −40 | INVENTION EXAMPLE |
| E-1 | 5.9 | 0.9 | 762 | 1026 | 12 | −50 | INVENTION EXAMPLE |
| E-2 | 7.3 | 0.9 | 934 | 989 | 14 | −50 | INVENTION EXAMPLE |
| E-3 | 6.8 | 1 | 862 | 1007 | 13 | −60 | INVENTION EXAMPLE |
| E-4 | <u>11.6</u> | 1.8 | 816 | <u>923</u> | 13 | <u>0</u> | COMPARATIVE EXAMPLE |
| E-5 | <u>14.2</u> | 1.9 | 843 | 1092 | 11 | <u>20</u> | COMPARATIVE EXAMPLE |
| E-6 | 6.1 | 1 | 879 | 1021 | 13 | −50 | INVENTION EXAMPLE |
| E-7 | 6 | 1.1 | 924 | 991 | 13 | −50 | INVENTION EXAMPLE |
| F-1 | 5.7 | 1.3 | 749 | 1042 | 12 | −40 | INVENTION EXAMPLE |
| G-1 | 7.3 | 1.1 | 761 | 1006 | 13 | −50 | INVENTION EXAMPLE |
| H-1 | 7.9 | 1.5 | 782 | 1124 | 13 | −50 | INVENTION EXAMPLE |
| I-1 | 7.1 | 1 | 781 | 1019 | 14 | −40 | INVENTION EXAMPLE |
| J-1 | 6 | 1.1 | 746 | 1047 | 12 | −60 | INVENTION EXAMPLE |
| J-2 | 7.5 | 0.9 | 873 | 1007 | 14 | −50 | INVENTION EXAMPLE |
| J-3 | 6.4 | 1.1 | 972 | 1026 | 13 | −70 | INVENTION EXAMPLE |
| J-4 | <u>11.9</u> | 0.9 | 624 | <u>842</u> | 15 | <u>30</u> | COMPARATIVE EXAMPLE |
| J-5 | <u>13.5</u> | 1.7 | 806 | 1112 | 8 | <u>−10</u> | COMPARATIVE EXAMPLE |
| J-6 | 7.4 | <u>2.3</u> | 933 | 1078 | 12 | <u>−30</u> | COMPARATIVE EXAMPLE |
| J-7 | 3.8 | <u>2.1</u> | 924 | 1072 | 9 | <u>−30</u> | COMPARATIVE EXAMPLE |

EACH UNDERLINE MEANS BEING OUT OF THE RANGE OF THE PRESENT INVENTION.
* HR DENOTES HOT-ROLLED STEEL SHEET. GI DENOTES HOT-DIP GALVANIZED STEEL SHEET. GA DENOTES ALLOYED HOT-DIP GALVANIZED STEEL SHEET ON HOT-ROLLED STEEL SHEET.

TABLE 3-2

| ID | Type | | | | Phase | | | | | | | Classification |
|---|---|---|---|---|---|---|---|---|---|---|---|---|
| J-8 | HR | 54 | 0 | <u>46</u> | FERRITE | 5 | 5.3 | 1.7 | 643 | <u>879</u> | 17 | <u>−20</u> | COMPARATIVE EXAMPLE |
| J-9 | HR | 0 | 0 | <u>100</u> | FERRITE, PEARLITE | <u>0</u> | 8.1 | 1.4 | 887 | <u>935</u> | 14 | <u>−10</u> | COMPARATIVE EXAMPLE |
| J-10 | GI | 70 | 30 | 0 | — | 5.1 | 6.8 | 0.9 | 910 | 1031 | 13 | −50 | INVENTION EXAMPLE |
| J-11 | GA | 70 | 30 | 0 | — | 4.6 | 6.9 | 0.9 | 948 | 1018 | 13 | −50 | INVENTION EXAMPLE |
| K-1 | HR | 100 | 0 | 0 | — | 6.3 | 6.6 | 0.8 | 802 | 1046 | 12 | −50 | INVENTION EXAMPLE |
| L-1 | HR | 100 | 0 | 0 | — | 7.4 | 7.9 | 1.1 | 945 | 1208 | 11 | −40 | INVENTION EXAMPLE |
| M-1 | HR | 100 | 0 | 0 | — | 8.2 | 6.3 | 0.8 | 947 | 1231 | 10 | −40 | INVENTION EXAMPLE |
| M-2 | HR | 67 | 33 | 0 | — | 10.4 | 7.2 | 1.1 | 1108 | 1193 | 11 | −50 | INVENTION EXAMPLE |
| M-3 | HR | 95 | 5 | 0 | — | 4.2 | 6.6 | 1 | 1078 | 1210 | 10 | −60 | INVENTION EXAMPLE |
| M-4 | HR | 72 | 0 | <u>28</u> | FERRITE | 7.2 | <u>12.2</u> | 0.9 | 692 | <u>963</u> | 12 | <u>0</u> | COMPARATIVE EXAMPLE |
| M-5 | HR | 83 | 17 | 0 | — | 7.9 | <u>11.7</u> | 1.4 | 962 | 1324 | 7 | <u>−20</u> | COMPARATIVE EXAMPLE |
| M-6 | HR | 100 | 0 | 0 | — | 9.1 | 8.7 | <u>3.1</u> | 1023 | 1165 | 9 | <u>0</u> | COMPARATIVE EXAMPLE |
| M-7 | HR | 100 | 0 | 0 | — | 8.4 | 3.2 | <u>4.3</u> | 997 | 1309 | 6 | <u>−20</u> | COMPARATIVE EXAMPLE |
| M-8 | HR | 74 | 0 | <u>26</u> | FERRITE | 9.5 | 6.2 | 1 | 849 | <u>942</u> | 13 | <u>20</u> | COMPARATIVE EXAMPLE |
| M-9 | HR | 30 | 0 | <u>70</u> | FRESH MARTENSITE | <u>0.6</u> | 8.4 | 1.2 | 1160 | 1350 | 7 | <u>30</u> | COMPARATIVE EXAMPLE |
| M-10 | GI | 72 | 28 | 0 | — | 8.3 | 7 | 1 | 1088 | 1172 | 13 | −50 | INVENTION EXAMPLE |
| M-11 | GA | 72 | 28 | 0 | — | 8.1 | 7.1 | 1 | 1128 | 1152 | 12 | −50 | INVENTION EXAMPLE |
| N-1 | HR | 100 | 0 | 0 | — | 10.4 | 8.2 | 1.1 | 960 | 1223 | 12 | −60 | INVENTION EXAMPLE |
| O-1 | HR | 100 | 0 | 0 | — | 8.9 | 8.3 | 1.2 | 951 | 1242 | 12 | −60 | INVENTION EXAMPLE |
| P-1 | HR | 100 | 0 | 0 | — | 10.6 | 6.4 | 1.1 | 976 | 1199 | 13 | −60 | INVENTION EXAMPLE |
| Q-1 | HR | 100 | 0 | 0 | — | 16.2 | 6.7 | 1 | 1076 | 1372 | 11 | −60 | INVENTION EXAMPLE |
| R-1 | HR | 100 | 0 | 0 | — | 17.5 | 8.9 | 1.2 | 1069 | 1381 | 11 | −50 | INVENTION EXAMPLE |
| S-1 | HR | 100 | 0 | 0 | — | 19.5 | 5.8 | 0.9 | 1168 | 1530 | 9 | −40 | INVENTION EXAMPLE |
| S-2 | HR | 33 | 67 | 0 | — | 22.6 | 6.9 | 1 | 1384 | 1473 | 10 | −60 | INVENTION EXAMPLE |
| S-3 | HR | 87 | 13 | 0 | — | 16.8 | 5.9 | 1.2 | 1286 | 1503 | 9 | −50 | INVENTION EXAMPLE |
| S-4 | HR | 73 | 0 | <u>27</u> | FERRITE | 15.6 | <u>10.8</u> | 1.1 | 862 | 1372 | 8 | <u>−20</u> | COMPARATIVE EXAMPLE |
| S-5 | HR | 92 | 8 | 0 | — | 17.5 | <u>11.8</u> | 1.3 | 1032 | 1638 | 6 | <u>−30</u> | COMPARATIVE EXAMPLE |

TABLE 3-2-continued

| | | | | | | | | | | | | | |
|---|---|---|---|---|---|---|---|---|---|---|---|---|---|
| S-6 | HR | 100 | 0 | 0 | — | 14.2 | 7.5 | <u>2.2</u> | 1277 | 1453 | 12 | <u>−10</u> | COMPARATIVE EXAMPLE |
| S-7 | HR | 100 | 0 | 0 | — | 16.7 | 3.9 | <u>2.9</u> | 1386 | 1603 | 4 | <u>−30</u> | COMPARATIVE EXAMPLE |
| S-8 | HR | 83 | 0 | <u>17</u> | FERRITE | 18.3 | 6.2 | 1.2 | 803 | <u>971</u> | 8 | <u>−10</u> | COMPARATIVE EXAMPLE |
| S-9 | G I | 68 | 32 | 0 | — | 13.9 | 6.5 | 1 | 1385 | 1492 | 10 | −50 | INVENTION EXAMPLE |
| S-10 | G A | 68 | 32 | 0 | — | 12.1 | 6.5 | 1.1 | 1421 | 1470 | 11 | −50 | INVENTION EXAMPLE |
| a-1 | HR | 0 | 0 | <u>100</u> | FERRITE | <u>0</u> | 16.2 | 1.4 | 330 | <u>462</u> | 34 | −80 | COMPARATIVE STEEL |
| b-1 | HR | 91 | 0 | <u>9</u> | RETAINED AUSTENITE | <u>0.4</u> | 3.8 | 1.2 | 1826 | 2429 | 4 | 60 | COMPARATIVE STEEL |
| c-1 | HR | 84 | 0 | <u>16</u> | FERRITE | 2.1 | 5.4 | 1 | 892 | 1086 | 14 | 0 | COMPARATIVE STEEL |
| d-1 | HR | 100 | 0 | 0 | — | <u>0.9</u> | 4.9 | 1.1 | 926 | 1118 | 11 | −20 | COMPARATIVE STEEL |
| f-1 | HR | 100 | 0 | 0 | — | 3.9 | 6.4 | 0.8 | 826 | 1031 | 8 | 0 | COMPARATIVE STEEL |
| g-1 | HR | 100 | 0 | 0 | — | 4.2 | 5.9 | 1.2 | 842 | 1007 | 9 | −10 | COMPARATIVE STEEL |
| h-1 | HR | 66 | 0 | <u>34</u> | FERRITE | 3.7 | 5 | 1.2 | 501 | <u>832</u> | 15 | −20 | COMPARATIVE STEEL |
| i-1 | HR | 100 | 0 | <u>0</u> | — | 4 | 6.2 | 1.1 | 792 | 1042 | 13 | −30 | COMPARATIVE STEEL |
| j-1 | HR | 100 | 0 | 0 | — | 3.9 | <u>13.2</u> | 1.5 | 803 | 1038 | 12 | −10 | COMPARATIVE STEEL |
| k-1 | HR | 100 | 0 | 0 | — | 4.5 | 3.2 | 1.4 | 783 | 1019 | 13 | −10 | COMPARATIVE STEEL |
| l-1 | HR | 100 | 0 | 0 | — | 4.1 | 3.1 | 2.3 | 891 | 1143 | 13 | 0 | COMPARATIVE STEEL |

EACH UNDERLINE MEANS BEING OUT OF THE RANGE OF THE PRESENT INVENTION.
* HR DENOTES HOT-ROLLED STEEL SHEET. GI DENOTES HOT-DIP GALVANIZED STEEL SHEET. GA DENOTES ALLOYED HOT-DIP GALVANIZED STEEL SHEET ON HOT-ROLLED STEEL SHEET.

INDUSTRIAL APPLICABILITY

According to the present invention, it becomes possible to be used at a very cold district, and therefore, industrial contribution thereof is extremely remarkable.

The invention claimed is:

1. A manufacturing method of a hot-rolled steel sheet, comprising:
smelting a steel having a composition containing:
in mass %,
C: 0.01 to 0.2%;
Si: 2.5% or less (not including "0" (zero));
Mn: 4.0% or less (not including "0" (zero));
P: 0.10% or less;
S: 0.03% or less;
Al: 0.001 to 2.0%;
N: 0.01% or less (not including "0" (zero));
O: 0.01% or less (not including "0" (zero));
Ti: 0.03 to 0.30%;
Nb: "0" (zero) to 0.30%;
Cu: "0" (zero) to 2.0%;
Ni: "0" (zero) to 2.0%;
Mo: "0" (zero) to 1.0%;
V: "0" (zero) to 0.3%;
Cr: "0" (zero) to 2.0%;
Mg: "0" (zero) to 0.01%;
Ca: "0" (zero) to 0.01%;
REM: "0" (zero) to 0.1%;
B: "0" (zero) to 0.01%; and
the balance being composed of iron and impurities and casting the steel into a slab, and then directly heating the cast slab to 1200° C. or higher or once cooling the cast slab and then heating the cast slab to 1200° C. or higher;
performing hot rolling in which a reduction ratio of rolling at the final stage of rough rolling is set to 25% or more and a rolling temperature is set to lower than 1100° C. and the rough rolling is completed, an obtained rough-rolled piece is heated by 10° C. or higher before finish rolling, and a finishing temperature of finish rolling to be performed subsequently is set to 900° C. or higher; and
performing cooling at an average cooling rate of 50° C./sec or more from the finishing temperature of the finish rolling to 400° C. and performing coiling at 100° C. to 390° C.

2. The manufacturing method of the hot-rolled steel sheet according is claim 1, further comprising:
performing a galvanizing treatment or a galvanealed treatment after the coiling.

3. The manufacturing method of the hot-rolled steel sheet according to claim 1, wherein said coiling is performed at a temperature of 100° C. to 380° C.

* * * * *

UNITED STATES PATENT AND TRADEMARK OFFICE
CERTIFICATE OF CORRECTION

| | | |
|---|---|---|
| PATENT NO. | : 11,208,702 B2 | Page 1 of 1 |
| APPLICATION NO. | : 16/263457 | |
| DATED | : December 28, 2021 | |
| INVENTOR(S) | : Akifumi Sakakibara et al. | |

It is certified that error appears in the above-identified patent and that said Letters Patent is hereby corrected as shown below:

On the Title Page

After Item (62) Related U.S. Application Data, please insert:
--(30) Foreign Application Priority Data
May 14, 2013   (JP).................. 2013-102144--

In the Claims

At Column 30, Line 41, in Claim 2:
Please change "according is claim 1" to --according to claim 1--

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*